United States Patent
Kolahi et al.

(10) Patent No.: US 7,647,841 B2
(45) Date of Patent: Jan. 19, 2010

(54) PROCESS FOR OPERATION OF A CORIOLIS MASS FLOW RATE MEASUREMENT DEVICE

(75) Inventors: Kourosh Kolahi, Kiel (DE); Ralf Storm, Essen (DE)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 11/773,139

(22) Filed: Jul. 3, 2007

(65) Prior Publication Data

US 2008/0041168 A1 Feb. 21, 2008

(30) Foreign Application Priority Data

Jul. 4, 2006 (DE) ................ 10 2006 031 198

(51) Int. Cl.
*G01F 1/84* (2006.01)

(52) U.S. Cl. ................................. 73/861.356

(58) Field of Classification Search ........... None
See application file for complete search history.

(56) References Cited

U.S. PATENT DOCUMENTS

| 5,295,084 | A | * | 3/1994 | Arunachalam et al. | ........ 702/50 |
| 5,602,346 | A | * | 2/1997 | Kitami et al. | .......... 73/861.356 |
| 5,767,665 | A | * | 6/1998 | Morita et al. | ............ 324/76.52 |
| 2008/0184813 | A1 | * | 8/2008 | Patten et al. | ........... 73/861.355 |

* cited by examiner

*Primary Examiner*—Harshad Patel
(74) *Attorney, Agent, or Firm*—David S. Safran; Roberts Mlotkowski Safran & Cole, P.C.

(57) ABSTRACT

A process for operating a Coriolis mass flow rate measurement device which has at least one measurement tube, the measurement tube being excited into vibrations with a predetermined excitation frequency and a predetermined excitation phase. The response phase which is achieved thereby and the rate of change of the response phase are detected and the excitation frequency is changed by the frequency amount which arises based on a predetermined function from the detected rate of change of the response phase. This makes it possible to maintain continuous measurement of the mass rate of flow even if two-phase flows occur.

12 Claims, 2 Drawing Sheets

PROCESS FOR OPERATION OF A CORIOLIS MASS FLOW RATE MEASUREMENT DEVICE

BACKGROUND OF THE INVENTION

1. Field of the Invention

The invention relates to a process for operating a Coriolis mass flow rate measurement device which has at least one measurement tube, the measurement tube being excited into vibrations with a predetermined excitation frequency and a predetermined excitation phase.

2. Description of Related Art

Coriolis mass flow rate measurement devices (CMDs) generally have a single measurement tube or a plurality of measurement tubes through which a medium flows, with a mass rate of flow which is to be determined. Thus, for example, there are Coriolis mass flow rate measurement devices with a single straight measurement tube and Coriolis mass flow rate measurement devices with two measurement tubes which run curved.

It is common to these Coriolis mass flow rate measurement devices that the measurement tubes through which a medium flows form a mechanical vibration system which is influenced by the flowing medium. Thus, the density of the medium changes the resonant frequency of the vibration system, while the mass rate of flow of the medium changes the vibration form. As a result, in addition to the mass rate of flow, among other things, also the density of the flowing medium can be determined.

Coriolis mass flow rate measurement devices are characterized by high measurement precision. Thus, measurement of the mass rate of flow with a precision of less than 0.1% is possible. Moreover, with Coriolis mass flow rate measurement devices, in addition to the mass rate of flow, other values can be determined which are derived, in part, from primary measurement values. Examples of these derived parameters of the medium flowing through the measurement tube are the volumetric flow rate, the mass or volumetric amount and the concentration of the flowing medium. Thus, Coriolis mass flow rate measurement devices are multivariable measurement devices which are often used not only for a primary measurement tasks, but in addition can deliver important secondary diagnosis and quality information about a process.

The problem in Coriolis mass flow rate measurement devices is multiphase flows, such as two-phase flows. Examples of multiphase flows, specifically of a two-phase flow, are gas bubbles in a liquid which can be caused, for example, by cavitation in valves or pumps or intake of air at leaks. Furthermore, one example of a two-phase flow is a system of solids in a liquid, for example, caused by crystallization or sudden detachment of deposits in a pipeline system through which the medium is flowing. Finally, there is the example of two-phase flows in mixtures of insoluble liquids, therefore emulsions, which can be caused, for example, by changing the medium which is flowing through the pipeline system.

If, during operation of a Coriolis mass flow rate measurement device, a multiphase flow occurs or the ratio of the phases of the multiphase flow changes, generally, also the resonant frequency of the measurement tube through which the medium is flowing changes. Since the measurement tube is typically excited at the resonant frequency, thus the vibration excitation of the measurement tube must be readjusted. In conventional processes, this is often associated with the loss of the operating point, i.e., the frequency and phase of the vibration excitation must be re-determined so that, essentially, the Coriolis mass flow rate measurement device must be restarted. However, during the restart phase, it is not possible to measure the mass rate of flow.

SUMMARY OF THE INVENTION

Therefore, it is the object of the invention to devise such a process for operating a Coriolis mass flow rate measurement device (CMD) with which continuous mass flow rate measurement operation is possible even if multiphase flows occur or the phase portions in a multiphase flow change.

Proceeding from the initially described process for operation of a Coriolis mass flow rate measurement device, this object is achieved in that the response phase which is achieved based on the vibration excitation and the rate of change of the response phase are detected and the excitation frequency is changed by the frequency amount which arises by means of a predetermined function from the detected rate of change of the response phase.

This approach in accordance with the invention is based on the finding that the rate of change of the response phase is a function of the difference frequency between the excitation frequency and the resonant frequency which is actually present in the excitation mode. In accordance with the invention, this finding is used to very quickly track the excitation frequency so that the operating point of the Coriolis mass flow rate measurement device is not lost.

Furthermore, according to one preferred development of the invention, it is provided that the phase shift between the excitation phase and the response phase is set to a predetermined phase value, preferably specifically to a predetermined phase value of zero.

The invention also relates to a process for operation of a Coriolis mass flow rate measurement device which has at least one measurement tube, the measurement tube being excited by means of an excitation signal to vibration excitations, the vibration signal which has been produced thereby being detected and being subjected to A/D conversion and the detected vibration signal being used to determine at least one parameter of a medium which is flowing through the measurement tube and at least one parameter of the vibration excitation.

To achieve the aforementioned object, in this process for operating a Coriolis mass flow rate measurement device, it is provided that A/D conversion of the vibration signal for use to determine the parameter of the medium flowing through the measurement tube is independent of the A/D conversion of the vibration signal for use to establish the parameter of the vibration excitation.

That the two A/D conversions are "independent" of one another for the purposes of the invention means that their parameters can be selected independently of one another. According to one preferred development of the invention, it is provided especially that the time constant of A/D conversion of the vibration signal for use for determining the parameter of the medium which is flowing through the measurement tube is different from the time constant of A/D conversion of the vibration signal used for establishing the parameter of the vibration excitation. According to one preferred development of the invention, it is also provided that the cutoff frequency of A/D conversion of the vibration signal for use for establishing the parameter of the vibration excitation is greater than the cut-off frequency of A/D conversion of the vibration signal for use for determining the parameter of the medium flowing through the measurement tube.

The "independence" of the two A/D conversions which is under consideration can finally be achieved according to one preferred development of the invention especially by the use of two A/D converters which are different from one another or one A/D converter with separate filter stages or with inner taps for separate signals.

Furthermore, the invention relates to a process for operating a Coriolis mass flow rate measurement device which has at least one measurement tube, the measurement tube being excited to vibrations by means of at least analog excitation signal which is periodic in time intervals, the analog response signal achieved thereby being detected and subjected to A/D conversion by means of an A/D converter so that a digital response signal is produced, the digital response signal being used for determining a digital excitation signal and the digital excitation signal being subjected to D/A conversion by means of a D/A converter so that an analog excitation signal is formed.

The aforementioned object is achieved in this process for operating a Coriolis mass flow rate measurement device in that a predetermined additional dead time is added to the respective hardware-specific dead time of the A/D converter or of the D/A converter.

In accordance with the invention, therefore, no attempt is made to implement a dead time as short as possible, but instead, a dead time is sought with which a stable controlled system results. According to one preferred development of the invention, it is provided especially that at least one of the dead times is set such that it corresponds to an integral multiple of half the period of the excitation signal.

The invention also relates to a process for operating a Coriolis mass flow rate measurement device which has at least one measurement tube, the measurement tube being excited by means of a periodic measurement signal to vibrations, the vibration signal which has been achieved thereby being detected and the amplitude of the vibration signal being set to a predetermined value as a manipulated variable by means of the amplitude of the excitation signal.

The aforementioned object is achieved in this process for operating a Coriolis mass flow rate measurement device in that the amplitude of the excitation signal is set at the zero passages of the excitation signal. In this way, the signal-noise ratio is increased and the efficiency of the driving power is improved.

In accordance with the invention, there is finally a process in which the variance of the operating frequency and the driving power of the Coriolis mass flow rate measurement device and the attenuation of the measurement tube are determined in order to automatically adapt the controller parameters.

Preferred embodiments of the invention are explained below in particular with reference to the drawings.

DETAILED DESCRIPTION OF THE INVENTION

Conventional mass flow rate measurement devices which work according to the Coriolis principle are characterized in operation with single-phase flows with respect to their accuracy and reliability. However, this reliability is generally absent in multiphase flows. A multiphase flow is defined as a flow which is composed of at least two phases with physical properties which are different from one another. These phases can consist of the same or of different substances. Phases are thus homogeneous and spatially limited regions of the flow. Examples are liquid-solid flows, gas-liquid flows, gas-solid flows, water-steam flows and water-air flows. In particular, multiphase flows also occur in processes such as filling, emptying, process start-up and switching of valves, and in swelling in the flow.

In applications with multiphase flows, considerable measurement errors typically occur. The major cause of this is the occurrence of asymmetrical filling of the measurement tube which leads to very rapid fluctuations of the resonant frequency of the measurement tube through which flow is taking place. Furthermore, the occurrence and disappearance of secondary flows in the measurement tube result in rapid attenuation, specifically when a secondary flow occurs, or rapid attenuation equalization, specifically when a secondary flow disappears. Fundamentally secondary flows are caused by different densities of the multiphase flows.

Rapid attenuation and attenuation equalization of the measurement tube by the transient flow and by the simultaneous rapid change of the resonant frequency often cause loss of the operating point in conventional, relatively slow control processes compared to the change of flow. Then, the maximum available power is no longer enough to maintain the vibrations of the measurement tube. The result is that Coriolis forces are no longer induced so that the mass flow can no longer be measured either. On the other hand, in the presence of a multiphase flow, energy is pumped into the vibrations of the measurement tube in order to maintain the vibrations of the measurement tube, and thus, the measurability of the mass flow, all the energy in the sudden exposure of the multiphase flow will be used to excite vibrations of the measurement tube at the new resonant frequency so that preventive shutoff is necessary for preventing deformations and damages of the measurement tube. For this reason, it is desirous to have a process for operating a Coriolis mass flow rate measurement device (CMD) which makes it possible to maintain the operating point even when multiphase flows occur.

Figure 1:
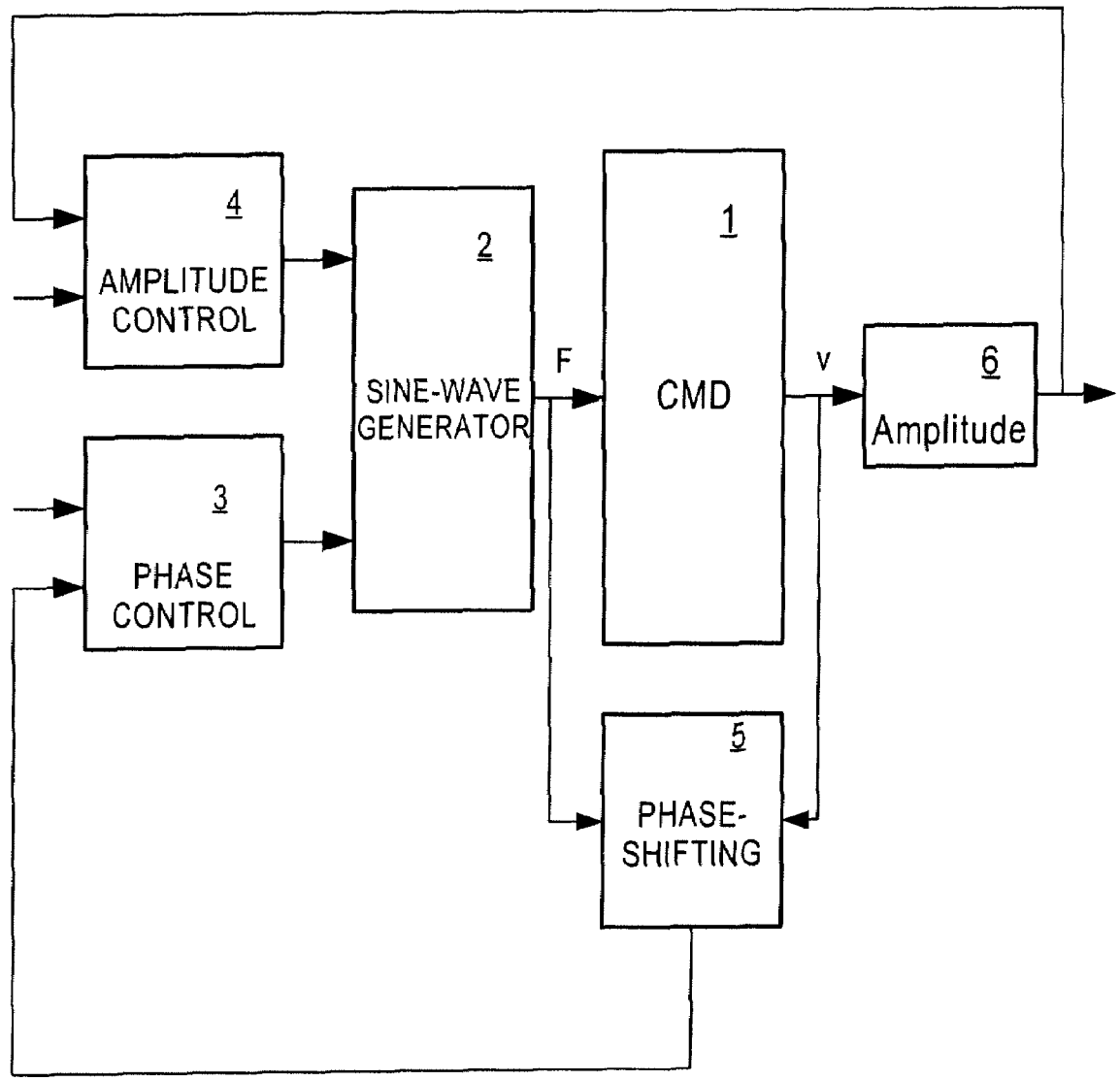
FIG. 1 schematically shows excitation of the measurement tube via a controlled generator and FIG. 2 schematically shows excitation of the measurement tube via direct feedback.

The following description of one preferred embodiment of the invention proceeds from a Coriolis mass flow rate measurement device 1 shown in FIG. 1 and which has a single measurement tube. The vibrations of this measurement tube can be described in a simplified manner by an oscillator for the driving mode with the following physical-mathematical model of the second order (equation 1):

$$G_1(s) = \frac{k_1 s}{s^2 + 2\omega_{01} d_1 s + \omega_{01}^2} \tag{1}$$

This transfer function has three parameters, specifically the spring constant $c_1$, the vibrating mass $m_1$ and the attenuation coefficient $d_1$. The determination equation 2 reads as follows:

$$k_1 = \frac{1}{m_1}, \omega_{01} = \sqrt{\frac{c_1}{m_1}} \tag{2}$$

The parameters of the measurement tube $m_1$ and $d_1$ are changed very quickly by the multiphase flow. Thus, according to the change of the vibrating mass $m_1$ and the attenuation coefficient $d_1$, a highly time-variant system is present. This means that the dynamics of control must keep step with the dynamics of change of the system since otherwise interruption of the measurement of process quantities is inevitable.

The dynamics of control is determined in addition to the mechanical structure of the Coriolis mass flow rate measurement device 1 by the following:

the speed with which the location of the resonant frequency can be considered, the stability and dynamic behavior of the Coriolis mass flow rate measurement device 1 for given group delay times or dead times of the hardware components used, efficient use of available manipulated variables and the extent to which the control algorithms used can be adapted to the mass flow rate measurement device 1.

With consideration of these aspects, three control methods are determined below, specifically a method of forced excitation, a method with self-contained excitation and a method with hybrid excitation, therefore a combination of forced excitation with self-contained excitation. For reasons of clarity, the model of the measurement device 1 for purposes of control is simplified to such an extent that it can be reproduced by the behavior of the driving mode by the transfer function (equation 1). This means that the other natural forms, such as the Coriolis mode, and couplings between the existing natural forms are not considered in the description of control. This is a good idea since, preferably, the driving mode is the vibration form for which the device is operated in resonance. Thus, this vibration form is determinative for control at the operating point.

In forced excitation, the driving of the measurement tube according to the preferred embodiment of the invention described here is supplied via a controlled generator 2, as is apparent from FIG. 1. Control of the generator 2 takes place such that the phase between the excitation F of the measurement tube which is proportional to the force and its response v which is proportional to speed is zero. Moreover, the amplitude of the velocity signal is specified and kept constant.

In conventional applications, it has been assumed for phase control 3 that the frequency of the output signal v of the driving mode is equal to the frequency of the excitation signal F. This assumption is dropped for this invention since it applies only under the assumption that the measurement tube is in a quasi-steady-state which is generally not present in a multiphase flow. For state transitions, the output signal v is composed at least of superposition of the attenuated resonant frequency and induced excitation signal F. Therefore, the following (equation 3) applies:

$$v_1(t) = A\sin(\omega t + \varphi) + Be^{-\omega_{01}Dt}\sin(\omega_{01}t) \quad (3)$$

Here $\omega$ is the frequency of the induced excitation, and the parameters A and B are generally a function of the properties of the mass flow rate measurement device 1 and of the fluid which flows through the mass flow rate measurement device 1. The output signal v (equation 3) contains information about the location of the current resonant frequency. It is used in the conventional mass flow rate measurement devices which are operated self-contained and in which there is no forced excitation, but the excitation signal F is derived from self-contained vibrations. Thus, in the self-contained excitation 7, the term $A\sin(\omega t+\varphi)$ in the output signal is eliminated.

In this case of forced excitation, different processes are used to accelerate phase control 3. It is common to these processes that the location of the current resonant frequency is considered in the control. This can be done using different processes, of which two different ones are described below.

According to a first preferred process, the output signal v is demodulated as in a conventional forced excitation. For this purpose, the output signal is multiplied by the known generated excitation signal using equations 4 & 5:

$$v_1(t)\sin(\omega t) = A\sin(\omega t + \varphi)\sin(\omega t) + \quad (4)$$
$$Be^{-\omega_{01}Dt}\sin(\omega_{01}t)\sin(\omega t)$$
$$\frac{A}{2}\left[\cos(\varphi) + \underbrace{\cos(2\omega t + \varphi)}_{\text{Filtered out}}\right] +$$
$$\frac{B}{2}e^{-\omega_{01}Dt}\left[\cos(\omega_{01} - \omega)t + \underbrace{\cos(\omega_{01} + \omega)t}_{\text{Filtered out}}\right]$$

$$v_1(t)\cos(\omega t) = A\sin(\omega t + \varphi)\cos(\omega t) + \quad (5)$$
$$Be^{-\omega_{01}Dt}\sin(\omega_{01}t)\cos(\omega t)$$
$$\frac{A}{2}\left[\sin(\varphi) + \underbrace{\sin(2\omega t + \varphi)}_{\text{Filtered out}}\right] +$$
$$\frac{B}{2}e^{-\omega_{01}Dt}\left[\sin(\omega_{01} - \omega)t + \underbrace{\sin(\omega_{01} + \omega)t}_{\text{Filtered out}}\right]$$

The double frequency portions in these equations are filtered out using a lowpass filter. The signal portions with the difference of the forced driving frequency and the current resonant frequency are however further processed. The actually computed phase, specifically the output of the phase detector, is computed from the filtered signals in accordance with equation 6:

$$\phi_{berachnet} = \arctan\left[\frac{\frac{A}{2}\cos(\varphi) + \frac{B}{2}e^{-\omega_{01}Dt}\cos(\omega_{01} - \omega)t}{\frac{A}{2}\sin(\varphi) + \frac{B}{2}e^{-\omega_{01}Dt}\sin(\omega_{01} - \omega)t}\right] \quad (6)$$

This result can be summarized as follows: In the quasi-steady-state, the computed phase can agree with the actual phase shift 5 by the measurement tube. In the transition from one quasi-steady-state to another quasi-steady-state, the phase migrates with a speed which is a function of the frequency difference between the excitation frequency and the resonant frequency. This important information about the spacing of the excitation frequency and the current resonant frequency is used to increase the speed of phase control 3. This accelerates the start-up of the new excitation frequency and correction of the phase shift to zero. This prevents the measurement tube vibration from failing.

According to a second preferred process, according to the rate of change of the phase a signal of the function of the difference frequency of the induced driving frequency and of the current resonant frequency is generated and is supplied as information about the location of the current resonant frequency in the course of control.

The use of parametric excitation, due to the multiphase flow, makes it possible to approach the current resonance point specifically and quickly, before the response of the parametric excitation has decayed. This prevents loss of the optimum operating point and makes a restart and repeated time-consuming search for the working point superfluous. Thus, the rate of mass flow can be measured in the transitions between different quasi-steady-states.

If the measurement tube is excited at its resonant frequency, the excitation is proportional to the initial velocity of the driving mode. This means that the excitation—viewed quasi-steady-state—is used to cover the losses which are proportional to speed. These losses are dependent on the material properties and on the composition of the flow. In order to keep the desired amplitude of the velocity signal constant regardless of noise, amplitude control 4 as described below is performed.

The amplitude 6 is measured very quickly, specifically, within less than one half period. The measurement 6 is taken according to the above described preferred embodiment of the invention using the process of absolute maxima seeking or using the gradient process. In the former method, the highest quantitative sampled value within a half period is established, preferably recursively. In the second process, the maximum value at the quantitative minimum of the gradient of the velocity signal is determined. A weighted combination of the determinations of the two processes can likewise be used.

Furthermore, the manipulated variable of amplitude control 4 is changed such that the pulses of the flowing mass particles do not change suddenly. This reduces the flow disturbance for purposes of measurement and increases the efficiency of the driving power or braking power since a driving signal which is as cleanly sinusoidal as possible with a small harmonic portion is used. To achieve this, the amplitude of the driving signal is preferably changed at, but at least in the vicinity of, the passages of the operating signal through zero.

In a self-contained excitation, it is assumed that a self-contained vibration on the output signal v has been established which is generally based on a wideband additive, or during operation on a multiplicative, i.e., parametric, excitation. The output signal based on the filter action of the mechanism with a band-pass property preferably contains signals of the frequency of the resonance point and can be described by the following equation 7:

$$v_1(t) = A e^{-\omega_{01} D t} \sin(\omega_{01} t) \tag{7}$$

Parameters A and D are generally a function of the properties of the Coriolis mass flow rate measurement device 1.

Figure 2:
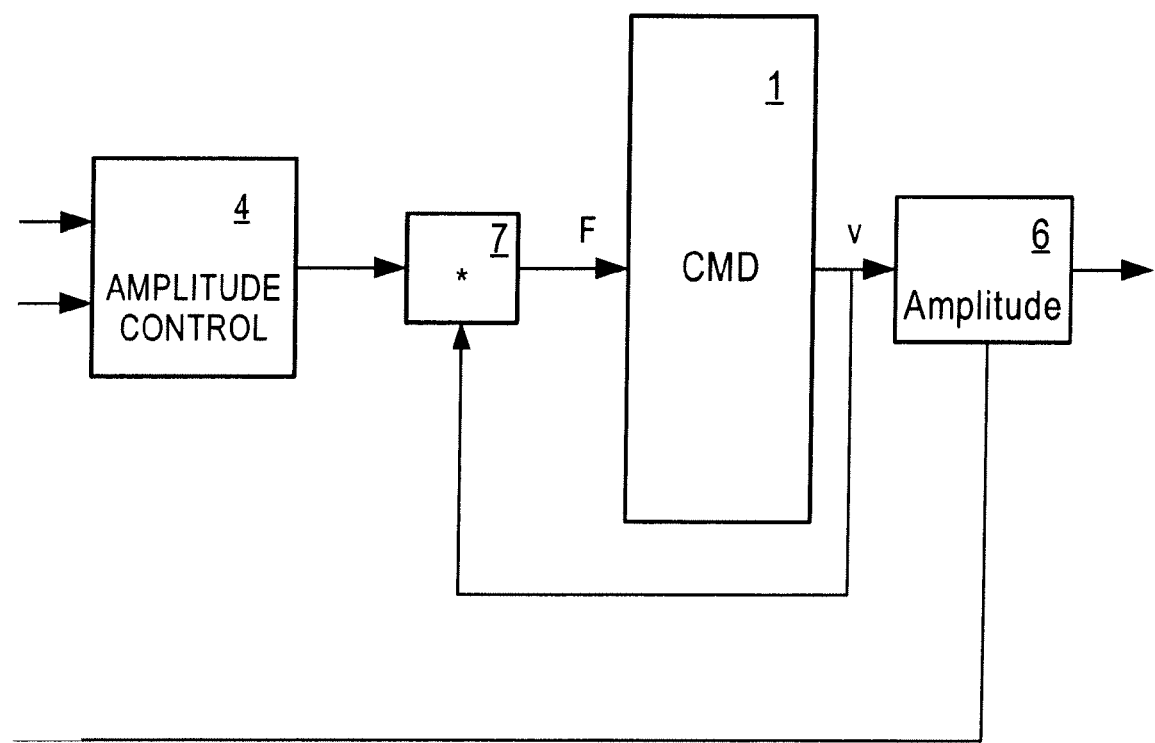

The output signal according to equation 7 contains information about the location of the current resonant frequency $\omega_{01}$. This signal is used in conventional mass flow rate measurement devices which are operated, self-contained, for excitation of the measurement tube. This means that there is no forced vibration, but that the excitation signal F is derived preferably from self-contained vibrations, as can be taken, for example, from FIG. 2. In another preferred implementation, noise which is superimposed from self-contained vibrations are additionally suppressed with a filter with special properties, such as bandpass properties.

Thus, in self-contained excitation a phase control circuit 3 is eliminated. This is advantageous in that the location of the resonant frequency for forced excitation can be promptly supplied to the control. However, the disadvantage is that the resonant frequency must subsequently be exactly determined for purposes of measuring the density and the flow rate. The main disadvantage ultimately lies in that the location of the resonant frequency can be lost as a result of noise, for example, due to multiphase flows. This can occur when the attenuation rises quickly and all the energy stored in the oscillator is quickly dissipated such that the output signal decays almost aperiodically in the least favorable case. In this case, since there is no forced excitation for identification of the resonant frequency, the system lacks any information about the resonant frequency, and the Coriolis mass flow rate measurement device 1 cannot set the operating point so that the flow rate cannot be measured. In conventional Coriolis mass flow rate measurement devices, then, restart with forced excitation during the starting phase is necessary; and this takes some time. This procedure with rapid changes of the flow conditions cannot be safely used in flows with transient phases. Two methods are used here to solve this problem:

The first process uses high-speed amplitude control, as described above. The amplitude controller 4 can be various controller types, such as PI, PID-VZ1, etc. In this connection, preferably, a digital compensation controller is used which compensates for the attenuation losses of the driving mode. Preferably, the following control law 8 is used:

$$u_k = u_{k-1} + p(w_k - y_k) + y_{k-2} + y_{k-} \tag{8}$$

u being the output of the controller, p being the gain, $\omega$ the setpoint of the amplitude and y being the actual value of the amplitude.

The second process which can be used as an alternative is hybrid control which uses a combination of the two controls with forced excitation or with self-contained excitation. Thus, it is ensured that the advantages of the two processes can be jointly used. In one preferred implementation, depending on the frequency difference between the forced and the current resonant frequency, detected as described above in conjunction with phase control 3, part of the output signal is directly fed back.

The time behavior of the Coriolis mass flow rate measurement device 1 is influenced by two parameters among others, specifically, the sample rate and the group delay times, i.e., the dead times in the hardware components. Studies of the behavior of the phase and amplitude controller 3, 4 show that the control behavior depends on the sampling rate, the phase control circuit 3 being more sensitive than the amplitude control circuit 4. The higher the sampling frequency, the shorter the correction time. Starting with sampling rates of 8 kHz, the improvement flattens out so that at roughly 100 kHz a significant improvement can no longer be ascertained.

If the transfer function of the driving mode is examined simplified, i.e., without considering the coupling of the other modes, as a linear, second order system, and the dead times $T_d$, for example, of the A/D converter and D/A converter, are considered, with $T_d$, the transfer function 9 is:

$$G_1(s) = \frac{k_1 s}{s^2 + 2\omega_{01} d_1 s + \omega_{01}^2} e^{-T_d t} \tag{9}$$

Without the dead time, the controlled system is stable for all proportional feedbacks. However, if dead times $T_d$ are allowed, the dead times influence the amplitude reserve and phase reserve and thus the dynamic behavior of the control circuit, so that, depending on the parameters of the transfer function, unstable controlled systems can arise. The stability of closed controlled systems is dependent on the parameters and the rate of their change. In a study of high speed parameter changes which always occur in two-phase flows, the set phase reserve and amplitude reserve can be reduced very quickly so that a tendency to vibration occurs.

In Coriolis mass flow rate measurement devices 1, there are two nonlinear control circuits which are very strongly coupled to one another, with dynamic time behavior which is not analytically present. Therefore, for initial orientation, the effect of the dead time on the two control circuits is experimentally studied. For this purpose, dead time elements with variable dead times were installed upstream from the D/A converter or downstream from the A/D converter. In the studies, the dead time was varied, and various unit step responses were recorded. As a result, it can be ascertained that, for a given dead time which has been caused, for example, by the D/A converter or the A/D converter, it can be prolonged and adapted preferably on the software side. Thus, in accordance with the invention, the stability and the dynamic behavior of the control circuits can be improved.

As described above, a careful examination of the group delay time or dead time is necessary in the control circuits for system stability. Especially in the case of parameter changes as occur, for example, in two-phase flows, it must be ensured that the dead times together with the variable system parameters lead to stable control circuits. Furthermore, it is important to use a dead time as small as possible so that prompt control—especially prompt correction of faults—can be implemented.

For robust stability, i.e., a large phase and amplitude reserve, it is important to choose and influence the dead time in a suitable manner. This can take place, for example, by the following measures:

selection of A/D and D/A converters with a group delay time as small as possible, use of separate A/D and D/A converters for control, on the one hand, and measurement of flow properties, on the other, or use of A/D and D/A converters with separate filter stages or filters with internal taps for separate signals with different time constants for control, on the one hand, and measurement of flow properties, on the other, use of a sampling rate as high as possible in order to obtain a dead time as small as possible at a given group delay time of digital FIR filters of A/D and D/A converters, and use of buffering in software, digital filters, and computerized phase rotation in the software in order to specifically set a certain dead time which leads to stable, and moreover, fast system behavior.

The resulting dead time which arises from the dead time which is fixed by the hardware and the software-dictated dead time which is additionally introduced, can then be coupled permanently to the operating point. This means that the additional dead time is dynamically adapted to the vibration period. Thus, the resulting dead time can be set, for example, to a multiple of half the duration of the vibration period.

The invention claimed is:

1. Process for operating a Coriolis mass flow rate measurement device which has at least one measurement tube, comprising the steps of:
    exciting the measurement tube into vibrations with a predetermined excitation frequency and a predetermined excitation phase,
    detecting a response phase and a rate of change of a response phase resulting from excitation of the measurement tube, and
    changing the excitation frequency by a frequency amount which is a predetermined function of the detected rate of change of the response phase,
    wherein the operating point of the Coriolis mass flow rate measurement device is maintained even when multiphase flow occurs.

2. Process as claimed in claim 1, further comprising the step of setting a phase shift between the excitation phase and the response phase to a predetermined phase value.

3. Process as claimed in claim 2, wherein the predetermined phase value is zero.

4. Process for operating a Coriolis mass flow rate measurement device which has at least one measurement tube, comprising the steps of:
    exciting the measurement tube to vibrations by means of an excitation signal so as to produce a vibration signal,
    detecting the vibration signal produced and subjecting the vibration signal to A/D conversion, and
    using the detected vibration signal to determine at least one parameter of a medium which is flowing through the measurement tube and at least one parameter of vibration excitation,
    wherein A/D conversion of the vibration signal for determining the parameter of the medium flowing through the measurement tube is performed independent of the A/D conversion of the vibration signal performed for establishing the parameter of the vibration excitation.

5. Process as claimed in claim 4, wherein a time constant of A/D conversion of the vibration signal for determining the parameter of the medium which is flowing through the measurement tube is different from a time constant of A/D conversion of the vibration signal for establishing the parameter of the vibration excitation.

6. Process as claimed in claim 5, wherein a cutoff frequency of A/D conversion of the vibration signal for establishing the parameter of the vibration excitation is greater than a cut-off frequency of A/D conversion of the vibration signal for determining the parameter of the medium flowing through the measurement tube.

7. Process as claimed in claim 6, wherein two A/D converters are used which are one of different from one another, A/D converters with separate filter stages and A/D converters with inner taps for separate signals.

8. Process as claimed in claim 4, wherein a cutoff frequency of A/D conversion of the vibration signal for establishing the parameter of the vibration excitation is greater than a cut-off frequency of A/D conversion of the vibration signal for determining the parameter of the medium flowing through the measurement tube.

9. Process as claimed in claim 4, wherein two A/D converters are used which are one of different from one another, A/D converters with separate filter stages and A/D converters with inner taps for separate signals.

10. Process for operating a Coriolis mass flow rate measurement device which has at least one measurement tube, comprising the steps of:
    exciting the measurement tube to vibrations by means of at least analog excitation signal which is periodic in time intervals,
    detecting an analog response signal produced by excitation of the measurement tube, and
    subjected the analog response signal to A/D conversion by means of an A/D converter so that a digital response signal is produced,
    using the digital response signal for determining a digital excitation signal, and
    subjecting the digital excitation signal to D/A conversion so that an analog excitation signal is formed,
    wherein a predetermined additional dead time is added to respective hardware-specific dead time of one of the A/D converter and the D/A converter.

11. Process as claimed in claim 10, wherein at least one dead time is set to corresponds to an integral multiple of half the period of the excitation signal.

12. Process for operating a Coriolis mass flow rate measurement device which has at least one measurement tube, comprising the steps of:
    exciting the measurement tube to vibrations by means of a periodic excitation signal,
    detecting a vibration signal resulting from said exciting of the measurement tube, and
    setting the amplitude of the vibration signal to a predetermined value as a manipulated variable by means of the amplitude of the excitation signal,
    wherein the amplitude of the excitation signal is set at zero passages of the excitation signal.

* * * * *